United States Patent [19]

Condò et al.

[11] Patent Number: 4,942,025

[45] Date of Patent: Jul. 17, 1990

[54] PROCESS FOR THE MANUFACTURE OF GRANULAR MONOHYDRATED SODIUM PERBORATE

[75] Inventors: Antonino Condò, Milan; Renzo Ferrario, Coriano Laghetto, both of Italy

[73] Assignee: Ausimont S.p.A., Milan, Italy

[21] Appl. No.: 432,309

[22] Filed: Nov. 3, 1989

Related U.S. Application Data

[63] Continuation of Ser. No. 355,118, May 18, 1989, abandoned, which is a continuation of Ser. No. 205,208, Jun. 10, 1988, abandoned.

[30] Foreign Application Priority Data

Jun. 17, 1987 [IT] Italy ................................ 20930 A/87

[51] Int. Cl.$^5$ .......................... C01B 15/12; C01B 35/12
[52] U.S. Cl. .................................... 423/282; 423/279; 423/280; 423/281
[58] Field of Search ................ 423/279, 280, 281, 282

[56] References Cited

U.S. PATENT DOCUMENTS

| | | | |
|---|---|---|---|
| 3,623,836 | 11/1971 | Denaeyer et al. | 423/281 |
| 3,914,380 | 10/1975 | Dillenburg et al. | 423/279 |
| 4,211,759 | 7/1980 | Mollard | 423/274 |
| 4,298,585 | 11/1981 | Malafosse et al. | 423/279 |

FOREIGN PATENT DOCUMENTS

0194952  9/1986  European Pat. Off. ............ 423/279

OTHER PUBLICATIONS

Handbook of Chemistry and Physics, 49th edition Weast, p. B-245.

*Primary Examiner*—John Doll
*Assistant Examiner*—Lori F. Cuomo
*Attorney, Agent, or Firm*—Stevens, Davis, Miller & Mosher

[57] ABSTRACT

Process for the manufacture of granular monohydrated sodium perborate, endowed with abrasion resistance, starting from the corresponding tetrahydrated perborate, characterized in that a carboxylic acid, containing from 1 to 3 C atoms, or an alkali metal salt thereof, is added to the tetrahydrated perborate, already present in the granular state, whereafter a dehydration of the tetrahydrated perborate is carried out.

9 Claims, 2 Drawing Sheets

PROCESS FOR THE MANUFACTURE OF GRANULAR MONOHYDRATED SODIUM PERBORATE

This application is a continuation of now abandoned application Ser. No. 355,118, filed May 18, 1989 which in turn is a continuation of application Ser. No. 205,208 filed June 10, 1988 now abandoned.

BACKGROUND OF THE INVENTION

The granular monohydrated sodium perborate ($NaBO_2.H_2O$) is generally obtained by dehydration of the so-called tetrahydrated salt ($NaBO_2.H_2O_2.3H_2O$) in the granular state and is mainly used as a bleaching agent for detergent formulations.

The monohydrated salt is essentially showing three advantages in comparison with the tetrahydrated salt: a higher content of available oxygen, a higher heat stability and a higher dissolution rate into water. However, it is known that the monohydrated salt is remarkably more brittle than the tetrahydrated one. One of the main reasons which have hitherto limited its exploitation is residing in the fact that, as a consequence of the manufacture of the product, the brittleness involves a variation of the distribution of the particle size and an enriching of the powder with the finest fractions. The main users of perborate do not want to have a product showing a high content of fine powder, in that it causes serious hygienic and ecological problems during the mixing of the components and can favour the caking of the detergent when it is manufactured. In order to avoid that the monohydrated salt, owing to its brittleness, be crushed by the pneumatic conveyors (everywhere employed by manufacturers and users) it is preferred to transport the monohydrated salt in bags rather than in bulk and all this involves higher burdens, as to either the packaging requirements or the reduced storage capacity. Hence the necessity of having a moohydrated salt endowed with good abrasion resistance, which can be conveyed in bulk without producing any fine powder. In the past two main ways were undertaken:

(a) control of the dehydration conditions of the tetrahydrated perborate and in particular control of temperature and moisture of the drying air (see for instance European Patents 155,894 and 194,952; U.S. Pat. No. 3,623,836, German Patent publications 2,444,780 and 2,258,319 and French Patent 1,081,421 (the content of which patents is an integrative part of the present application) or:

(b) addition of specific additives to the monohydrated perborate (see for instance German Patent 2,203,285).

However, in both cases, it was impossible to obtain a product to be conveyed in bulk and to wholly satisfy the expectations of the users.

Another way for solving the problem was indicated in European Patent 202,519; according to this patent, in the name of the Applicant, the use of additives (in this particular case sodium meta-silicate) is not performed on the finished monohydrated salt but on the tetrahydrated salt before its drying. By this way, the melting point of the tetrahydrated salt (otherwise 63° C.) is lowered down so that (during the starting step of dehydration on the particle surface) an initial melting takes place, by quick withdrawal of the molecules of crystallization water, which withdrawal gives the finished product the desired stiffness. By this way, it is possible to reach a decisive improvement of the abrasion resistance of the monohydrated perborate, by a simple way and independently of the drying method. However, the addition of meta-silicate does not allow to obtain a monohydrated perborate showing a particularly high content of available oxygen, because meta-silicate generally retains very firmly the crystallization water, which is not completely removed under the usual dehydration conditions of the tetrahydrated perborate. It had been tried since a long time to find new additives able to decrease the melting point of the tetrahydrated perborate (thus granting a high abrasion resistance of the corresponding monohydrate) and which do not contain any crystallization water at the end of the dehydration, thus assuring a sufficiently high content of available oxygen in the final product. The Applicant succeeded now in performing a process for obtaining granular monohydrated perborate endowed with a good abrasion resistance, which can be also transported in bulk and which exhibits a high content of available oxygen.

DISCLOSURE OF THE INVENTION

In its broadest aspect the invention concerns a process for the manufacture of granular monohydrated sodium perborate endowed with high abrasion resistance, starting from the corresponding tetrahydrated perborate, characterized in that a carboxylic acid containing from 1 to 3 C atoms, or an alkali metal salt thereof, is added to said tetrahydrated perborate, already present as a granular product, and that a dehydration of the perborate is then carried out, according to usual techniques, until substantially complete conversion (to monohydrated perborate).

An example of salts according to the invention are sodium formate, sodium acetate (anhydrous or trihydrate) and sodium propionate. These salts are wholly compatible with monohydrated perborate and with other components, generally used in detergent formulations; furthermore, they are wholly soluble in water and do not affect in any way the solubility and dissolution rate both of monohydrated perborate and of the detergent formulations. These salts can be used alone, in admixture among them or mixed with sodium silicates; in some cases the mixture is representing an improvement, in comparison with the use of a single compound, as to the mechanical resistance of the monohydrated salt. This is expecially true for acetate-formate mixtures.

The total amount of carboxylic acid or salt, on the dry tetrahydrated perborate, is generally from 0.2 to 2% b.w.; amounts lower than 0.2% show a reduced effect on the abrasion resistance, whereas amounts higher than 2% do not cause any substantial improvement; on the contrary, they worsen the content of active oxygen of the final monohydrated salt. Preferably, the amount of dry carboxylate is from 0.25 to 1% by weight, on the dry tetrahydrated perborate.

Salts of carboxylic acids can be added in the solid state or better as an aqueous solution. If the carboxylated salt is added in the solid state, it is preferable to add this salt finely ground (mulled) to the wet granular tetrahydrated perborates; if the carboxylic salt or acid is added as an aqueous solution, this solution must be poured dropwise or sprayed on the dry or wet granular tetrahydrated perborate; however, in this last case, the total free water in the additioned tetrahydrated perborate must be not higher than 10% b.w., on the dry tetrahydrated perborate, because an exceedingly wet product is causing problems as to movement and fluidization. By working with an aqueous solution, concentrations of the additive (in the solution) generally range from 5 to 50% b.w.; however, the preparation of aqueous solutions of these compounds do not involve any problem, because they are very soluble in water. Too diluted solutions give rise to an exceedingly wet tetrahydrated perborate, which shows the above mentioned drawbacks; too concentrated solutions, on the other hand, can give rise to a non homogeneous distribution of the additive in the tetrahydrated perborate (and consequently lower the effect of the additive itself). Preferably, the operation is carried out using aqueous solutions showing a carboxylic acid (or salt) content from 5 to 40% b.w., on the solution.

In order to assure a better distribution of the additive either dry or as a solution, it must be added to the tetrahydrate kept under agitation, in a suitable apparatus, such as for instance a rotating drum, a blade mixer or a fluidized bed. The movement of the mass must be maintained for all the time necessary to assure a perfect mixing of the components. The dissolution of the carboxylic acid or salt into water and the addition thereof to sodium tetrahydrated perborate are generally carried out at room temperature, but nothing is restraining the operator from working at a higher or lower temperature, provided that, in the addition step, the temperature of 63° C., namely the melting temperature of sodium tetrahydrated perborate, is not overcome. The drying of the tetrahydrated perborate to monohydrate salt can be carried out according to generally used techniques, under normal pressure or in vacuo, continuously or in batch, under static conditions or on a product maintained in movement. Generally, one can work in a fluidized bed dryer using hot-air, in one or more steps (in particular 1 or 4 steps connected in series). The temperature of the air entering the dryer is generally from 80° to 180° C. and preferably from 90° to 160° C.; it is possible to use either air or moist air; in this last case, we are recommending a moisture content equal to or lower than 86 g of water per Kg of dry air (dew point equal to or lower than 50° C.).

An advantage of the invention is the reduction of the fine product blown off by the air stream, being this amount the bigger the higher is the velocity of the air and the finer is the starting tetrahydrated salt.

During a fluidized bed drying, the blown off product generally accounts (at the most) for 5-15% of the loaded tetrahydrated salt and this product must then be separated by means of suitable devices (cyclones, sleeve filters, etc.) and added to the product or recycled. Now, it was noted that by use of a carboxylic acid or salt according to the invention the amount of blown off product can be cut down to 50%. A further advantage of the granular monohydrated salt, obtained according to the invention, is its whole compatibility with activators, softening agents and other geneerally used components of formulations based on perborate; see for instance European Patent 137,533 and Swiss Patent Application 04703/85-6, this last in the name of the Applicant.

BRIEF DESCRIPTION OF THE DRAWINGS

The accompanying

Figure 1:
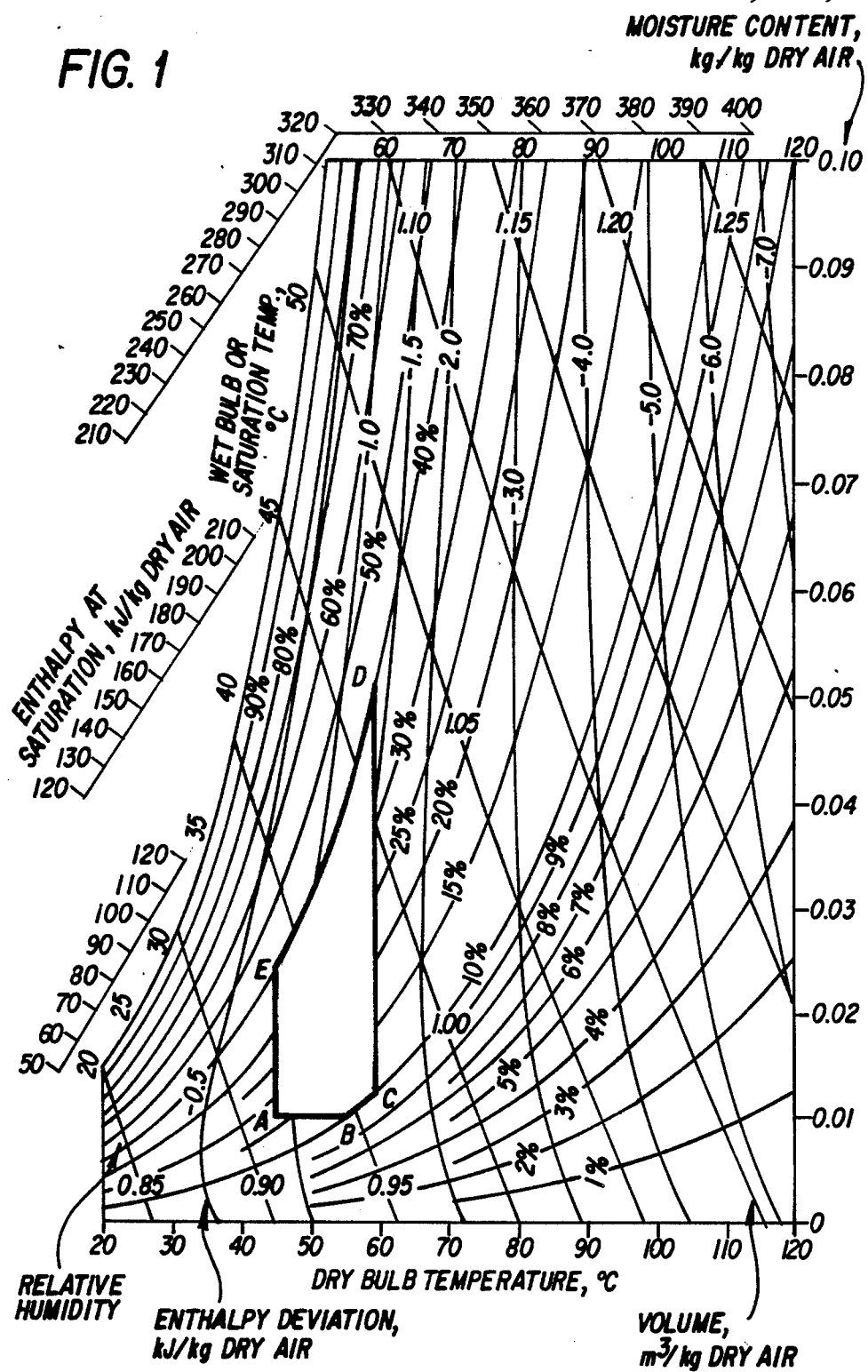
FIGS. 1 and 2 show certain relevant dry bulb temperature/moisture content relationships.

More particularly, the area A-B-C-D-E shown in FIG. 1 represents a moisture content of from 10 to 52 g/Kg, a relative humidity of from 10 to 40%, and a temperature of from 45° to 60° C.

Figure 2:
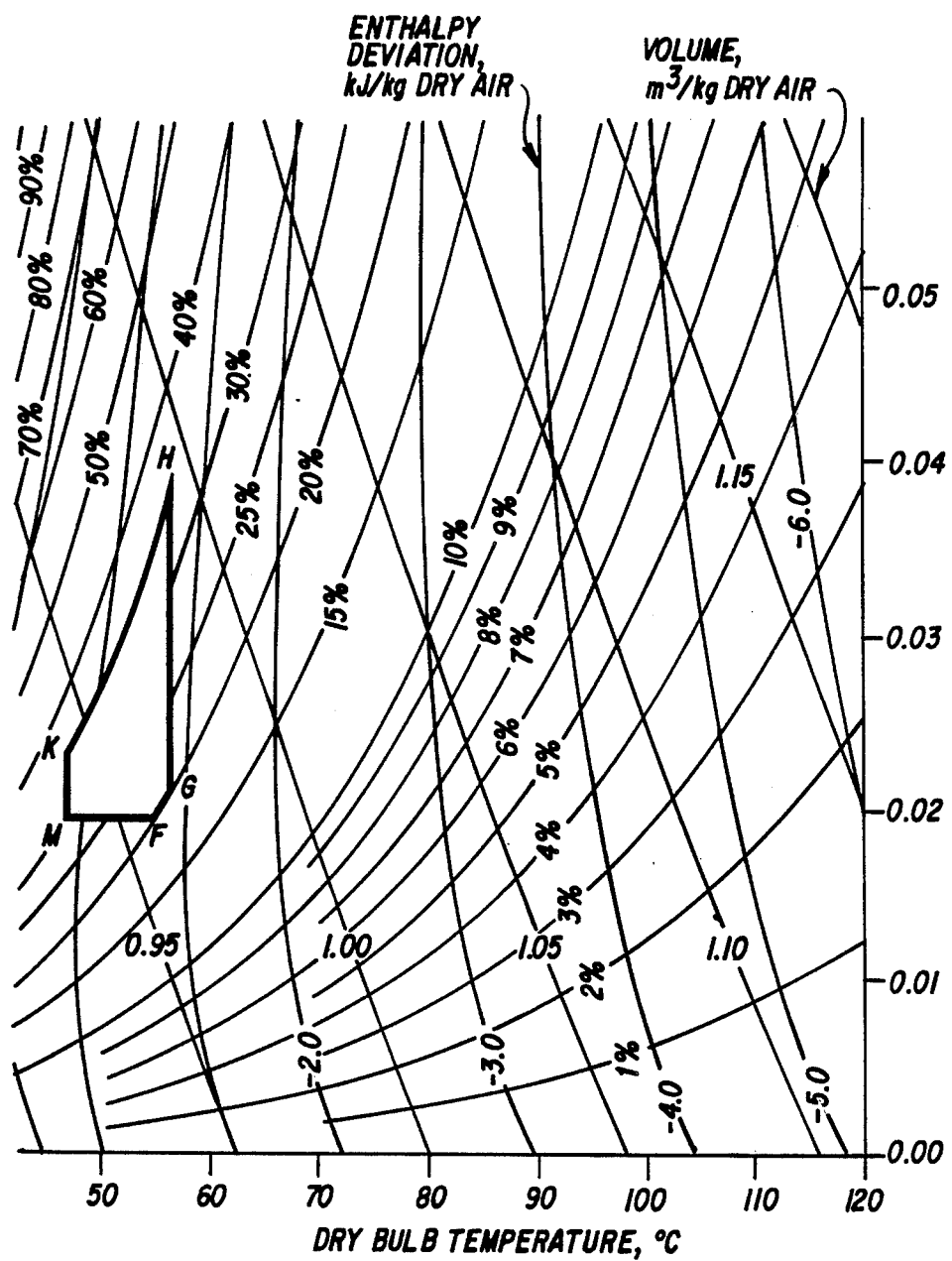

Similarly, in FIG. 2 the area M-F-G-H-K represents a moisture content of from 20 to 40 g/Kg, a relative humidity of from 20 to 36%, and a temperature of from 47° to 57° C.

The following examples illustrate some aspects of the invention, without limiting in any way the scope of the invention itself.

OPERATIVE CONDITIONS COMMON TO EXAMPLES 1-10

A sample of tetrahydrated sodium perborate from an industrial production (formula: $NaBO_2.H_2O_2.3H_2O$; available oxygen titre 10.2%) were sprayed, at room temperature and in a rotating drum (stainless steel; capacity 1 liter), with an aqueous solution of a selected carboxylic compound; the mass, after the addition, was maintained under agitation for about further 15 minutes, until the homogenization was complete. The thus additioned salt was then dehydrated in a cylindrical fluidized bed drier made of glass (diameter: 85 mm, height: 500 mm, diameter of the distributor: 44 mm) with a flow of 5000 Nl/h of dry air, (relative humidity 5%, at 20° C.) heated at a preestablished temperature. The sample was coming from an usual industrial production and showed the following characteristics:

| | |
|---|---|
| available oxygen content = | 10.18% b.w.; |
| bulk density = | 0.783 g/cm$^3$; |
| crushing loss = | 9.9% |
| particle size: | |
| higher than 0.80 mm = | 1.0% |
| 0.60–0.80 mm = | 10.6% |
| 0.40–0.60 mm = | 24.2% |
| 0.31–0.40 mm = | 22.0% |
| 0.20–0.31 mm = | 23.0% |
| 0.16–0.20 mm = | 11.8% |
| 0.10–0.16 mm = | 4.6% |
| lower than 0.10 mm = | 2.8% |

The monohydrated perborate obtained from each test was characterized by determining available oxygen content, bulk density, crushing loss, dissolution rate, surface area and distribution of the particle size.

Available oxygen was determined by titration with 0.1N potassium permanganate and bulk density was determined by measuring the mass of a sample freely poured into a cylinder of known capacity (without any settling).

Crushing loss was determined on the fraction between 0.4 and 0.8 mm (sharp opening) following European Standard Practice Instruction No. 7/17050 of June 10, 1971, which simulate a pneumatic conveyance); the lower the value obtained by this crushing test, the higher the abrasion resistance of the sample.

The dissolution rate was measured by the conductometric method on 1.5 g of product screened between 0.4 and 0.8 mm (sharp opening) in 750 cm$^3$ of water, at 20° C., under agitation. Surface area was determined by the BET method and the distribution of the particle size was determined by means of a vibratory screen (50 g of the product for 10' on screens of DIN series 4188).

EXAMPLE 1 (Comparative blank test)

A sample of 250 g of dry granular tetrahydrated perborate was dehydrated as such, without any previous addition of additive and carrying out the drying (in a fluidized bed) by means of 5000 Nl/h dry air, pre-heated at 120° C. for 70 minutes; the average temperature of the fluid mass, in the reactor, after about 20 minutes, was 54° C. and the relative humidity in the reactor was 14%. The characteristics of the obtained product are recorded on Table 1.

EXAMPLE 2

On the sample of Example 1, according to the previously described conditions, we sprayed a solution obtained by dissolving 0.625 g of sodium formate (HCOONa) in 10 cm$^3$ of water (concentration of the solution: about 6% b.w.). The thus additioned perborate, containing 0.25% b.w. of sodium formate on the starting tetrahydrated perborate, was dehydrated (as in example 1) by means of dry air (at 91° C.) for 135'; the average temperature of the mass was 48° C. and the relative humidity in the reactor was 12%. The characteristics of the monohydrated perborate are recorded on Table I. As it is clear, the crushing loss drastically dropped below the loss of Example 1.

EXAMPLE 3

A solution obtained by dissolving 1.25 g of sodium formate in 10 cm$^3$ of water (concentration of the solution: about 11% b.w.) was sprayed on the sample of Example 1, according to the described conditions. The thus additioned perborate, containing 0.5% b.w. of formate on the starting tetrahydrate, was dehydrated as in Example 2, by means of 90° C. air for 135' (average temperature of the mass=47° C., relative humidity=12%). Properties of the thus obtained monohydrated perborate are recorded on Table I.

EXAMPLE 4

A solution obtained by dissolving 1.25 g of anhydrous sodium acetate (CH$_3$COONa) into 10 cm$^3$ of water (concentration of the solution: about 11% b.w.) was sprayed onto the sample of Example 1, according to the conditions above. The thus additional perborate, containing 0.5% b.w. of sodium acetate on the starting tetrahydrate, was dehydrated as in Example 2 by means of 120° C. air for 80' (temperature of the mass=49° C.; relative humidity 18%). Properties of the thus obtained monohydrate are recorded on Table I.

EXAMPLE 5

A solution obtained by dissolving 2.50 g of anhydrous sodium acetate (CH$_3$COONa) into 10 cm$^3$ of water (concentration of the solution: about 20% b.w.) was sprayed onto the sample of Example 1, according to the conditions above. The thus additioned perborate, containing 1% b.w. of acetate on the starting tetrahydrate, was dehydrated as in Example 2 by means of 120° C. air for 70' (temperature of the mass=49° C.; relative humidity 18%). Properties of the thus obtained monohydrate are recorded on Table I.

EXAMPLE 6

A solution obtained by dissolving 5.0 g of sodium acetate (CH$_3$COONa) into 10 cm$^3$ of water (concentration of the solution: about 40% b.w.) was sprayed onto the sample of Example 1, according to the conditions above. The thus additioned perborate, containing 2% b.w. of sodium acetate on the starting tetrahydrate, was dehydrated as in Example 2 with 120° C. air for 80' (temperature of the mass=49° C.; relative humidity 15%). The characteristics of the thus obtained monohydrate are recorded on Table II.

EXAMPLE 7

A solution obtained by dissolving 1.25 g of sodium propionate (CH$_3$CH$_2$COONa) into 10 cm$^3$ of water (concentration of the solution about 33% b.w.) was sprayed onto the sample of example 1, according to the conditions above. The thus additioned perborate, containing 0.5% b.w. of propionate on the starting tetrahydrate, was dehydrated as in example 2 with 120° C. air for 70' (temperature of the mass 52° C.; relative humidity 16%). Properties of the thus obtained monohydrate are recorded on Table II.

EXAMPLE 8

A sample of 260 g of moist sodium tetrahydrated perborate containing 4% by weight of free water, was intimately admixed with 4.15 g of trihydrated sodium acetate crystals (CH$_3$COONa.3H$_2$O). The thus additioned perborate, containing 1% b.w. of anhydrous acetate on the dry starting tetrahydrate, was dehydrated as in example 2 with 120° C. air for 80' (temperature of the mass 51° C.; relative humidity 16%). Properties of the thus obtained monohydrate are recorded on Table II.

EXAMPLE 9

A solution obtained by dissolving 1.25 g of anhydrous sodium acetate (CH$_3$COONa) and 1.25 g of sodium formate (HCOONa) into 10 cm$^3$ of water (total concentration of the solution 20% b.w.) was sprayed onto the sample of example 1, according to the conditions above. The thus additioned perborate, containing 0.5% b.w. of formate on the starting tetrahydrate, was dehydrated as in example 2 with 91° C. air, for 135' (temperature of the mass 47° C.; relative humidity 12%). Properties of the thus obtained monohydrate, really excellent, are recorded on Table II.

EXAMPLE 10

A solution obtained by dissolving 0.62 g of anhydrous sodium acetate (CH$_3$COONa) and 1.88 g of sodium formate (HCOONa) into 10 cm$^3$ of water (total concentration of the solution 20% b.w.) was sprayed onto the sample of example 1, according to the described conditions. The thus additioned perborate, containing 0.75% by weight of formate and 0.25% by weight of acetate on the starting perborate tetrahydrate, was dehydrated as in example 2 with 91° C. air for 135' (temperature of the mass 46° C.; relative humidity 13%). Properties of the thus obtained monohydrate, really excellent, are recorded on Table II.

TABLE I(**)

| EXAMPLE | 1(*) | 2 | 3 | 4 | 5 |
|---|---|---|---|---|---|
| Melting agent | — | Na formate | See ex. 2 | Na acetate | see ex. 4 |
| (% b.w.) | — | 0.25 | 0.50 | 0.50 | 1.00 |
| Temp. of air (°C.) | 120 | 91 | 90 | 120 | 120 |
| Temp. of the mass (°C.) | 54 | 48 | 47 | 49 | 49 |
| Relative humidity (%) | 14 | 12 | 12 | 15 | 18 |
| Drying time | 70' | 135' | 135' | 80' | 70' |
| Available oxygen (% b.w.) | 15.65 | 15.61 | 15.52 | 15.54 | 15.43 |
| Surface area (m$^2$/g) | 9.7 | 6.4 | 5.8 | 5.7 | 5.6 |
| Bulk density (g/cm$^3$) | 0.561 | 0.554 | 0.565 | 0.565 | 0.577 |
| Crushing loss (%) | 73.0 | 38.2 | 33.1 | 32.6 | 32.3 |

TABLE I(**)-continued

| EXAMPLE | 1(*) | 2 | 3 | 4 | 5 |
|---|---|---|---|---|---|
| Dissolution time | less than 1' | see ex. 1 | see ex. 1 | see ex. 1 | see ex. 1 |
| Particle size: | | | | | |
| Higher than 0.80 mm | 0.8% | 0.8% | 0.6% | 0.6% | 1.0% |
| from 0.60 to 0.80 mm | 10.2% | 13.6% | 8.4% | 11.2% | 13.2% |
| from 0.40 to 0.60 mm | 24.8% | 28.6% | 22.0% | 27.6% | 28.8% |
| from 0.31 to 0.40 mm | 22.4% | 22.4% | 21.2% | 22.6% | 24.0% |
| from 0.20 to 0.31 mm | 24.2% | 22.0% | 26.6% | 24.2% | 21.8% |
| from 0.16 to 0.20 mm | 11.8% | 8.8% | 13.2% | 10.0% | 8.6% |
| from 0.10 to 0.16 mm | 5.6% | 3.4% | 6.8% | 3.4% | 2.6% |
| Lower than 0.10 mm | 0.2% | 0.4% | 1.2% | 0.4% | — |
| Blown off powder | | | | | |
| (a) grams | 14.0 | 8.5 | 8.0 | 7.8 | 7.4 |
| (b) % by weight on the feed perborate | 5.6% | 3.4% | 3.2% | 3.1% | 3.0% |

(*) Comparative example
(**) In each test granules of the dendritic type were obtained.

TABLE II

| EXAMPLE | 6 | 7 | 8 | 9 | 10 |
|---|---|---|---|---|---|
| Melting agent | Na acetate | Anhydrous Na propionate | Hydrated Na acetate | Acetate + formate | Acetate + formate |
| (% b.w.) | 2.00 | 0.50 | 1.00 | 0.5 + 0.5 | 0.25 + 0.75 |
| Air temp. (°C.) | 120 | 120 | 120 | 91 | 91 |
| Mass temp. (°C.) | 49 | 52 | 51 | 47 | 46 |
| Relative humidity (%) | 15 | 16 | 16 | 12 | 13 |
| Drying time | 80' | 70' | 80' | 135' | 135' |
| Available oxygen (% b.w.) | 15.34 | 15.51 | 15.43 | 15.45 | 15.49 |
| Surface area (m²/g) | 6.1 | 6.3 | 6.2 | 4.7 | 4.3 |
| Bulk density (g/cm³) | 0.551 | 0.562 | 0.549 | 0.562 | 0.569 |
| Crushing loss (%) | 36.2 | 38.0 | 37.1 | 23.9 | 21.8 |
| Dissolution time | 1' | see ex. 6 | see ex. 6 | see ex. 6 | see ex. 6 |
| Particle size: | | | | | |
| Higher than 0.80 mm | 1.0% | 0.6% | 1.0% | 1.0% | 1.0% |
| from 0.60 to 0.80 mm | 13.0% | 14.6% | 13.2% | 12.4% | 12.2% |
| from 0.40 to 0.60 mm | 30.0% | 31.0% | 30.6% | 28.2% | 27.6% |
| from 0.31 to 0.40 mm | 22.8% | 22.8% | 24.4% | 22.6% | 24.4% |
| from 0.20 to 0.31 mm | 22.0% | 19.8% | 22.6% | 22.0% | 24.6% |
| from 0.16 to 0.20 mm | 8.0% | 9.0% | 6.6% | 9.4% | 8.2% |
| from 0.10 to 0.16 mm | 3.0% | 2.2% | 1.4% | 3.6% | 1.8% |
| Lower than 0.10 mm | 0.2% | — | 0.2% | — | 0.2% |
| Blown off powder | | | | | |
| (a) grams | 8.2 | 8.5 | 8.3 | 6.5 | 6.3 |
| (b) % b.w. on the feed perborate | 3.3% | 3.4% | 3.3% | 2.6% | 2.5% |

Operative conditions common to examples 11-16

The tetrahydrated Na perborate of examples 1-10 was sprayed, at room temperature and in said rotating drum, by means of an aqueous solution of a prefixed carboxylic acid; we went on, thereafter, as in the former examples, slightly modifying the amount and the humidity of the feed air (showing a dew point from 0° to 30° C., namely a moisture content from 0 to 28 g per Kg of dry air) the same air being pre-heated at a prefixed temperature, depending on the other conditions of each single test.

EXAMPLE 11

300 g of dry and granular tetrahydrated Na perborate were sprayed by means of a solution obtained by dissolving 1.10 g of acetic acid into 10 cm³ of water (solution concentration=ca. 9.9% by weight). The thus additioned perborate, containing 0.36% by weight of acetic acid, was dehydrated for 40 minutes by means of 6000N liter/h of air saturated with water at 30° C. (moisture content: 28 g/Kg) and then heated at 140° C. The average temperature of the dehydrating mixture (at the outlet of the bed) was about 57° C. and the corresponding relative umidity was 35% (moisture content: 38 g of H₂O per Kg of dry air); the properties of the obtained mono-hydrated perborate are recorded on Table III.

EXAMPLE 12

300 g of the sample of example 11 were sprayed by means of a solution obtained by dissolving 2.16 g of acetic acid into 10 cm³ of water (solution concentration=ca. 17.7% by weight). The thus additioned perborate, containing 0.72% by weight of acetic acid, was dehydrated for 43 minutes by means of 6000N liter/h of air saturated with water at 25° C. (moisture content: 20 g/Kg) and then heated at 140° C. The average temperature of the dehydrating mixture was about 55° C. and the relative humidity was 32% (moisture content: 32 g/Kg); properties of mono-hydrated perborate are recorded on Table III.

EXAMPLE 13

300 g of the sample of example 11 were sprayed by means of a solution obtained by dissolving 1.00 g of formic acid into 10 cm³ of water (solution concentration=ca. 9.1% by weight). The thus additioned perborate, containing 0.33% by weight of formic acid, was dehydrated for 38 minutes by means of 6000N liter/h of air saturated with water at 25° C. (moisture content: 20 g/Kg) and then heated at 140° C. The average temperature of the dehydrating mixture was about 55° C. and the relative humidity was 35%, (moisture content: 34 g/Kg); properties of mono-hydrated perborate are recorded on Table III.

EXAMPLE 14

300 g of the sample of example 11 were sprayed by means of a solution obtained by dissolving 1.10 g of acetic acid and 1.00 g of formic acid into 10 cm³ of water (global solution concentration=ca. 17.3% by weight). The thus additioned perborate, containing 0.36% by weight of acetic acid and 0.33% by weight of formic acid, was dehydrated for 45 minutes by means of 6000N liter/h of air saturated with water at 20° C. (moisture content: 15 g/Kg) and then heated at 140° C. The average temperature of the dehydrating mixture was about 55° C. and the relative humidity was 29%, (moisture content: 30 g/Kg); properties of mono-hydrated perborate are recorded on Table III.

EXAMPLE 15

300 g of the sample of example 11 were sprayed by means of a solution obtained by dissolving 1.10 g of acetic acid and 1.00 g of formic acid into 10 cm³ of water (global solution concentration=ca. 17.3% by weight). The thus additioned perborate, containing 0.36% by weight of acetic acid and 0.33% by weight of formic acid, was dehydrated for 40 minutes by means of 6000N liter/h of dry air (moisture content: 5 g/Kg) heated at 140° C. The average temperature of the dehydrating mixture was about 55° C. and the relative humidity was 20% (moisture content: 22 g/Kg); properties of mono-hydrated perborate are recorded on Table III.

EXAMPLE 16

300 g of the sample of example 11 were sprayed by means of a solution obtained by dissolving 1.20 g of propionic acid into 10 cm³ of water (solution concentration=ca. 10.7% by weight). The thus additioned perborate, containing 0.40% by weight of propionic acid, was dehydrated for 40 minutes by means of 6000N liter/h of air saturated with water at 30° C. (moisture content: 28 g/Kg) and then heated at 140° C. The average temperature of the dehydrating mixture was about 56° C. and the relative umidity was 36% (moisture content equal to 38.4 g/Kg); properties of mono-hydrated perborate are recorded on Table III.

TABLE III

| EXAMPLE | 11 | 12 | 13 | 14 | 15 | 16 |
|---|---|---|---|---|---|---|
| Melting agent | $CH_3COOH$ | see ex 11 | HCOOH | HCOOH + $CH_3COOH$ | see ex.14 | Propionic acid |
| (% b.w.) | 0.36 | 0.72 | 0.33 | 0.33 +0.36 | see ex. 14 | 0.40 |
| Moisture content of the feed air (g/Kg) | 28 | 20 | 20 | 15 | 5 | 28 |
| Air temp. (°C.) | 140 | 140 | 140 | 140 | 140 | 140 |
| Mass temp. (°C.) (*) | 57 | 55 | 55 | 55 | 55 | 56 |
| Relative humidity (*) | 35% | 32% | 35% | 29% | 20 | 36% |
| Moisture content of the outlet air (*) | 38 | 32 | 34 | 30 | 22 | 38.4 |
| Drying time (min) | 40 | 43 | 38 | 30 | 40 | 40 |
| Available $O_2$ (% b.w.) | 15.72 | 15.70 | 15.38 | 15.57 | 15.74 | 15.60 |
| Surface area (m²/g) | n.a. | n.a. | n.a. | n.a. | n.a. | n.a. |
| Bulk density (g/cm³) | 0.570 | 0.562 | 0.565 | 0.568 | 0.558 | 0.565 |
| Crushing loss (%) | 18 | 21.3 | 19.4 | 19.1 | 25.2 | 22.0 |
| Dissolution time | less than 1' | see ex. 11 | see ex. 11 | see ex. 11 | see ex. 11 | see ex. 11 |
| Particle size | | | | | | |
| Higher than 0.80 mm | 0.4 | 1.0 | 0.8 | 0.8 | 0.8 | 0.8 |
| from 0.60 to 0.80 mm | 10.4 | 13.6 | 13.4 | 13.6 | 13.5 | 13.4 |
| from 0.40 to 0.60 mm | 29.0 | 29.8 | 29.0 | 32.6 | 29.5 | 29.1 |
| from 0.31 to 0.40 mm | 29.6 | 24.0 | 25.8 | 24.2 | 24.1 | 25.8 |
| from 0.20 to 0.31 mm | 24.8 | 23.6 | 23.6 | 20.8 | 24.1 | 23.3 |
| from 0.16 to 0.20 mm | 7.6 | 7.2 | 6.8 | 6.8 | 7.4 | 7.1 |
| from 0.10 to 0.16 mm | 1.2 | 0.8 | 0.6 | 1.2 | 0.6 | 0.6 |
| Lower than 0.10 mm | — | — | — | — | — | — |
| Blown off powder | | | | | | |
| (a) grams | 4.5 | 8.0 | n.a. | 3 | 12 | 8.0 |
| (b) % b.w. on the feed perborate | 1.5 | 3.2 | n.a. | 1 | 4 | 3.2 |

(*)At the outlet of the drum.

What we claim is:

1. A process of obtaining granular monohydrated sodium perborate endowed with resistance to abrasion, starting from the corresponding tetrahydrated perborate, characterized in that a carboxylic acid mixture consisting essentially of acetic acid, or alkali metal salt thereof, and formic acid, or alkali metal salt thereof, is added to said tetrahydrated perborate, already present in the granular state, then carrying out a dehydration of the tetrahydrated perborate until the conversion to monohydrated perborate is substantially complete, wherein, at the outlet of the dehydration zone, the moisture content is from 10 to 52 g/kg, the relative humidity is from 10 to 40%, and the temperature is from 45° to 60° C.

2. A process according to claim 1, wherein said alkali metal salts are sodium salts.

3. A process according to claim 2, wherein said sodium salts are a mixture of sodium formate and sodium acetate.

4. A process according to claim 1, wherein the amount of carboxylic acid mixture is from 0.2 to 2% by weight, on the dry tetrahydrated sodium perborate.

5. A process according to claim 1, wherein said carboxylic acid mixture is added in the dry state or as an aqueous solution to the tetrahydrated sodium perborate kept under agitation.

6. A process according to claim 5, wherein said carboxylic acid mixture is added as an aqueous solution, the amount of acid or salt being from 5 to 50%, by weight, on said solution.

7. A process according to claim 1, wherein the feed air entering the dehydration zone has a temperature from 80° to 180° C. and a moisture content equal to or lower than 86 g of water per Kg of dry air (dew point equal to or lower than 50° C.).

8. A process according to claim 1, wherein the feed air entering the dehydration zone has a temperature from 90° to 160° C. and a moisture content from 0 to 28 g/Kg (dew point: 0°-30° C.).

9. A process according to claim 1, wherein, at the outlet of the dehydration zone, the moisture content is from 20 to 40 g/kg, the relative humidity is from 20 to 36% and the temperature is from 47° to 57° C.

* * * * *